United States Patent [19]

Asayama

[11] Patent Number: 5,223,907
[45] Date of Patent: Jun. 29, 1993

[54] GUARD RAIL DETECTING DEVICE
[75] Inventor: Yoshiaki Asayama, Hyogo, Japan
[73] Assignee: Mitsubishi Denki K.K., Tokyo, Japan
[21] Appl. No.: 835,485
[22] Filed: Feb. 14, 1992
[30] Foreign Application Priority Data Feb. 18, 1991 [JP] Japan .................. 3-22485

[51] Int. Cl.$^5$ .............................. G01C 3/00
[52] U.S. Cl. .................... 356/1; 356/4; 358/105; 358/126
[58] Field of Search ............... 356/1, 4; 358/105, 126

[56] References Cited

U.S. PATENT DOCUMENTS

| 4,195,425 | 4/1980 | Leitz et al. | 356/28 |
| 4,589,770 | 5/1986 | Jones et al. | 356/1 |
| 4,668,084 | 5/1987 | Suzuki et al. | 356/1 |
| 4,916,302 | 4/1990 | Sorimachi | 356/1 |
| 5,023,712 | 6/1991 | Kajiwara | 358/105 |
| 5,131,740 | 7/1992 | Maekawa | 356/1 |
| 5,139,327 | 8/1992 | Tanaka | 356/1 |

FOREIGN PATENT DOCUMENTS 57-49841 10/1982 Japan .
63-38085 7/1988 Japan .

Primary Examiner—Mark Hellner
Attorney, Agent, or Firm—Sughrue, Mion, Zinn, Macpeak & Seas

[57] ABSTRACT

A guard rail detecting device mounted on a motor vehicle has: two image sensors spaced vertically to sense a scene in front of the motor vehicle; a window setting device for setting a plurality of windows on the display screen at predetermined positions; a distance calculating device for calculating the distances from the vehicle to the parts of the guard rail which are held as images in the windows; and a device for calculating the curvature of the guard rail from the distances thus calculated.

3 Claims, 3 Drawing Sheets

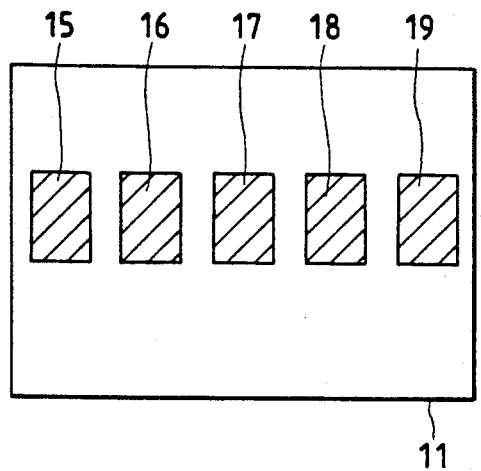
FIG. 2
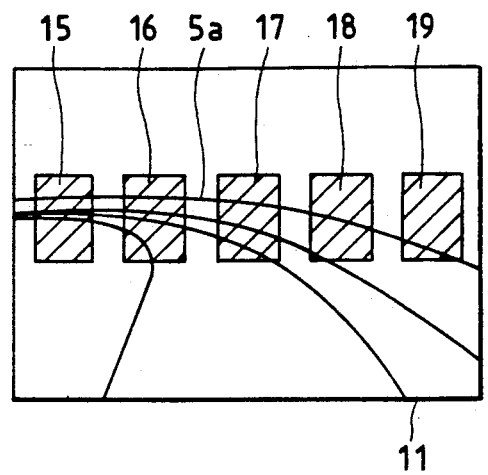
FIG. 3
FIG. 4
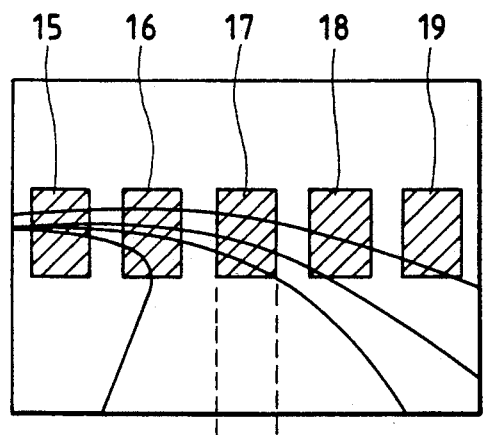
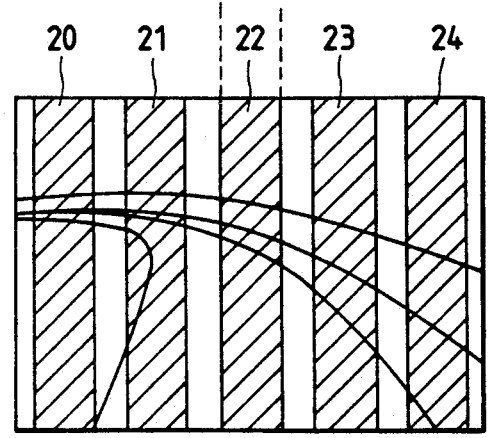

GUARD RAIL DETECTING DEVICE

BACKGROUND OF THE INVENTION

This invention relates to a guard rail detecting device in which an optical distance detecting device using an image sensor operates to measure the distance between a motor vehicle and a guard rail located ahead of it, thereby to predict the curvature of the guard rail.

An optical distance detecting device using an image sensor has been disclosed in the art, for instance, by Japanese Patent Examined Published Application Nos. Sho-63-38085/(1988) and Sho-63-46363/(1988). The device, as shown in FIG. 6, has two right and left optical systems having two lenses 1 and 2 which are spaced by a base length L from each other. Image sensors 3 and 4 are disposed at the focal length f of the two lenses 1 and 2, respectively. The output image signals of the image sensors 3 and 4 are applied to a signal processing unit 30, where they are shifted so as to be electrically superposed on each other. When the two image signals are superposed to the best possible extent, the amount of shift (l) is read to calculate the distance (R) between the position of the lenses and an object 31 from the following expression according to the trigonometrical measurement principle:

$$R = (f \times L)/l$$

On the other hand, a method of detecting the radius of curvature of a curved road along which a motor vehicle is traveling has been disclosed, for instance, by Japanese Unexamined Published Application No. Hei-1-285815/(1990). In the conventional method, a gyroscope or a geomagnetic sensor is employed to detect the radius of curvature of a curved road along which a motor vehicle is traveling.

In the case of the above-described conventional method, in order to detect the radius of curvature of a curved road, it is essential that the motor vehicle is already traveling along the curved road. Furthermore, the radius of curvature of a road cannot be detected before the motor vehicle reaches the curve int he road. Hence, even if there is a sharp turn ahead of the motor vehicle, it is impossible to warn the driver.

SUMMARY OF THE INVENTION

Accordingly, an object of this invention is to eliminate the above-described difficulty associated with the conventional method of detecting the radius of curvature of a curved road along which a motor vehicle travels. More specifically, an object of the invention is to provide a guard rail detecting device which detects the degree of curvature of a guard rail set along a curved road thereby to predict the radius of curvature of the curve in the road before the motor vehicle reaches the curve in the road.

The foregoing object of the invention has been achieved by the provision of a guard rail detecting device in which upper and lower image signals, which represent images formed on image sensors through a pair of upper and lower optical systems, are compared to electrically detect the deviation of the two images from each other thereby to measure the distance from the motor vehicle to a guard rail located ahead of the motor vehicle according to the principle of trigonometrical measurement. The invention includes window setting means for setting a plurality of windows on one of the upper and lower image signals at predetermined positions; distance calculating means for subjecting, with an image signal in each window as a reference signal, upper and lower image signals corresponding to the reference signal to comparison, to calculate the distance from the motor vehicle to the guard rail for every window; and means for predicting the curvature of the guard rail from the distances thus calculated.

In the guard rail detecting device of the invention, a plurality of windows are set on the display screen at the position where the image of the guard rail is provided. With the image in each window as a reference image, upper and lower images sensed with two image sensors are subjected to comparison, to electrically detect the deviation of the two images from each other, thereby to measure the distance from the vehicle to the part of the guard which corresponds to the image in the window. The distances thus measured and the positions of the windows are utilized to calculate the curvature of the guard rail.

BRIEF DESCRIPTION OF THE DRAWINGS

FIG. 2 is an explanatory diagram showing windows set on a display screen;

FIG. 3 is an explanatory diagram showing the image of a guard rail displayed on the display screen which is located ahead of a motor vehicle;

FIG. 4 is an explanatory diagram showing image regions compared with reference images in the windows;

DETAILED DESCRIPTION OF THE PREFERRED EMBODIMENT OF THE INVENTION

One preferred embodiment of this invention will be described with reference to the accompanying drawings.

Figure 1:
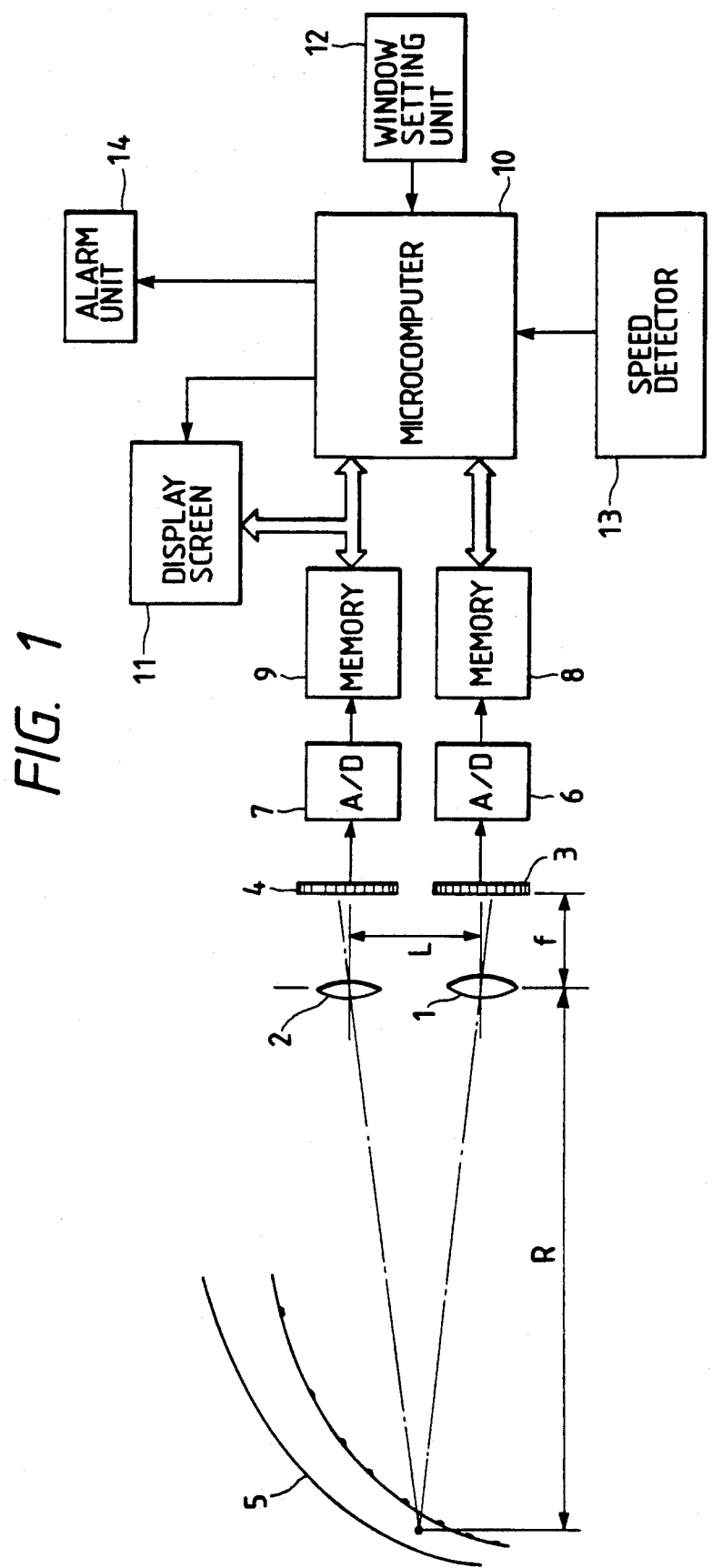
FIG. 1 is an explanatory diagram, partly as a block diagram, showing the arrangement of one example of a guard rail detecting device according to this invention.

FIG. 1 shows one example of a guard rail detecting device according to the invention installed on a motor vehicle, which measures the distance between, the vehicle and a guard rail set along a curved portion of a road ahead to predict the radius of curvature of the curved portion of the road. In FIG. 1, reference numerals 1 and 2 designate lenses forming upper and lower optical systems, respectively; 3 and 4, two-dimensional image sensors arranged for the lenses 1 and 2, respectively; 5, a guard rail set along a curve in the road ahead of the motor vehicle; 6 and 7, analog-to-digital converters; 8 and 9, memories; 10, a microcomputer; 11, a display screen for displaying an image sensed by one of the image sensors, the display screen 11 being controlled by the microcomputer 10; 12, a window setting unit for setting windows to define the area in which the distance between the guard rail 5 and the vehicle is measured. The window setting unit 12 sets a plurality of windows 15, 16, 17, 18 and 19 which, as shown in FIG. 2, are arranged in position on the display screen 11 in advance. Further in FIG. 1, reference numeral 13 designates a speed detector on the motor vehicle; and 14, an alarm unit such as a buzzer or the like.

The guard rail detecting device thus organized operates as follows. It is assumed that one of the image sensors, namely the image sensor 4, senses the image of a scene in front of the motor vehicle which, as shown in FIG. 3, includes the image 5a of a guard rail set along a curved road. In this case, the microcomputer 10 reads from the memory 9 the picture element signal in the window 17 which holds the guard rail image 5a and employs it as a reference image signal for distance measurement. Furthermore, the microcomputer 10, accesses the memory 8 in which the image signal of the other image sensor 3 has been stored, to select the region corresponding to the window 17, and, while shifting the image signal of the memory 8 with respect to the aforementioned reference image signal one picture element at a time, calculates the sum of the absolute values of the difference signals for every upper and lower picture elements. That is, by shifting the image signal of the memory 8 one picture element at a time, the position is obtained where it best corresponds to the image in the window 17. What this calculation concerns is the region 22 of the image in the memory 8 which corresponds in position to the window 17 holding the reference image signal as shown in FIG. 4. In this case the distance (R) between the guard rail 5 and the vehicle can be calculated from the following equation (1):

$$R = (f \times L)/(n \times P)$$

where n is the number of picture elements representing the distance through which the picture element has been shifted when, in the case where upper and lower picture elements are subjected to comparison as described above, the sum of the absolute values of the difference signals thereof is minimum; P, the pitch of picture elements; L, the base length of the optical systems; and f, the focal length of the lenses 1 and 2.

Thus, the distance from the vehicle to the region of the guard rail 5 selected with the window 17 can be detected. Similarly, the guard rail images 5a selected with the other windows 15, 16, 18 and 19 in the display screen 11 are subjected to image comparison in the respective arithmetic regions 20, 21, 23 and 24, respectively, so that, with respect to the windows 15, 16, 18 and 19, the distances to the guard rail are calculated from the above-described Equation (1), respectively.

Figure 5:
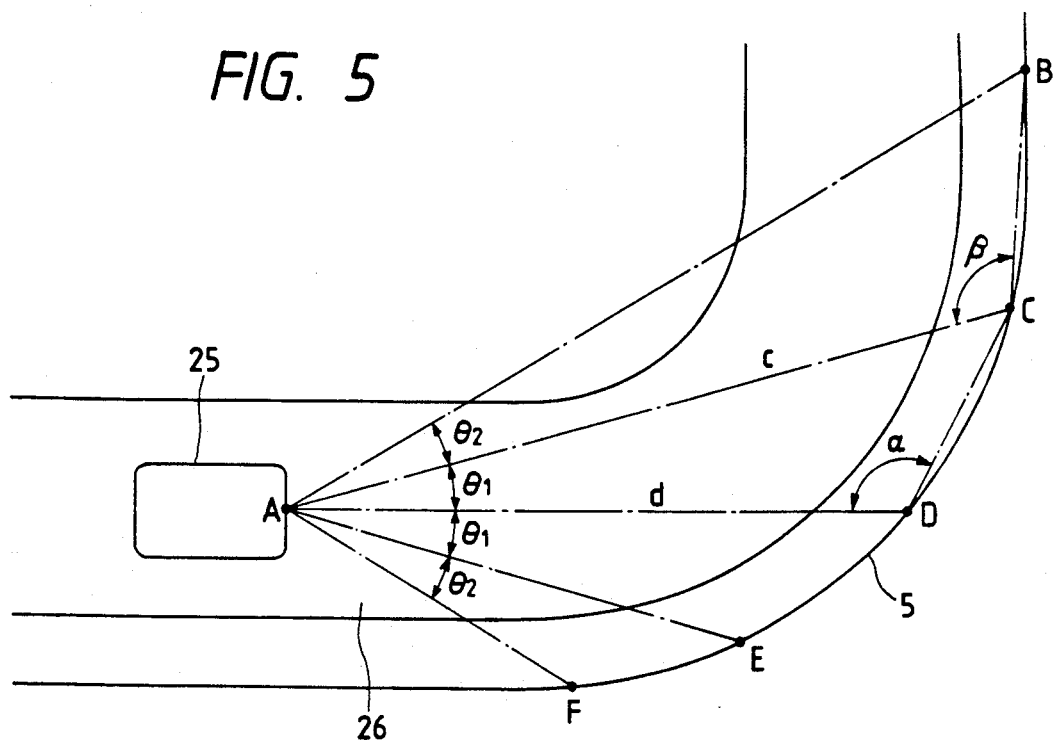
FIG. 5 is an explanatory diagram for a description of a method of predicting the curvature of a guard rail.
Figure 6:
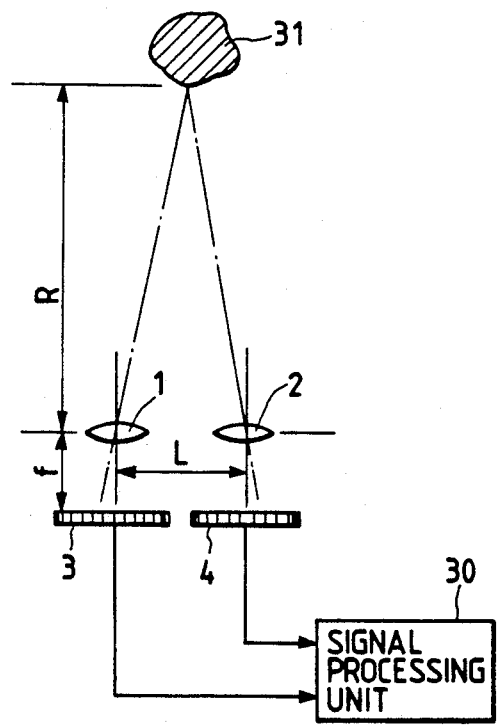
FIG. 6 is an explanatory diagram showing the arrangement of a conventional optical distance detecting device.

In the case where, as shown in FIG. 5, a guard rail 5 set along a road, along which a motor vehicle 25 travels, is curved to the left ahead, the distances from the point A where the lenses 1 and 2 are located and points on the guard rail are measured as follows; That is, the distance between the point A and a point D on the guard rail 5 is substantially measured with the central window 17; the distance between the point A and a point B on the guard rail 5, with the window 15; the distance between the point A and a point C on the guard rail 5, with the window 16; the distance between the point A and a point E on the guard rail, with the window 18; and the distance between the point A and a point F on the guard rail, with the window 19.

In this case, obviously the distance between the points A and C is longer than that between the points A and D, and the distance between the points A and E is even shorter. Visual angles $\theta_1$ and $\theta_1$ viewing the measuring points B, C, D, E and F are naturally determined from the positions of the windows 15 through 19 which have been defined in the display screen 11 in advance.

Hence, by obtaining the distance d between the points A and D and the distance c between the points A and C, the triangle ACD is determined in configuration. The angle α can be calculated from the following equation as is well known in the art:

$$\sin\alpha = \frac{c \cdot \sin\theta_1}{\sqrt{c^2 + d^2 - 2cd \cdot \cos\theta_1}}$$

Similarly, the angle β can be calculated. These calculations are carried out by the microcomputer 10. The angle α represents the degree of curvature of the guard rail 5 with the point D as a reference. That is, when it is an acute angle, the curve is sharp; and when it is an obtuse angle, the curve is gentle. The angle β represents the degree of curvature of the part of the guard rail 5 which extends from the point C. Thus, the degrees of curvatures of the guard rail at a plurality of points can be detected, as a result of which the curvature of the road ahead can be predicted.

From the fact that the distance between the points A and E is shorter than the distance between the points A and D, it can be detected that the road curves to the left ahead. When the microcomputer determines, from the values of the angles α and β that there is a sharp turn ahead, the alarm unit 14 is operated to inform the driver of the fact that the road is sharply curved to the left before the vehicle reaches the sharp turn.

As was described above, the guard rail detecting device mounted on a motor vehicle in which upper and lower image signals are subjected to comparison which represent images formed on the image sensors through a pair of upper and lower optical systems, to electrically detect the deviation of the two images from each other thereby to measure the distance from the motor vehicle to a guard rail located ahead of the motor vehicle according to the principle of trigonometrical measurement, operates as follows: A plurality of windows are set on one of the upper and lower image signals at predetermined positions, and the distances from the motor vehicle to a plurality of points on the guard rail which are held as images in the windows are measured through comparison of the upper and lower images corresponding to the image in each of the windows, and the distances thus measured are utilized to detect the degree of curvature of the guard rail. Hence, the direction and the curvature of a curved road can be predicted before the vehicle reaches the road. That is, with the guard rail detecting device, in driving the vehicle, the traffic conditions ahead can be detected in advance.

What is claimed is:

1. A guard rail detecting device in which upper and lower image signals representing images formed on image sensors through a pair of upper and lower optical systems are compared with each other, to electrically detect the deviation of said two images from each other thereby to measure a distance from a vehicle to a plurality of points on a guard rail located ahead of said vehicle according to the principle of trigonometrical measurement, said guard rail detecting device comprising:

window setting means for setting a plurality of windows on one of said upper and lower image signals at predetermined positions;

distance calculating means for calculating the distance from said vehicle to said guard rail for each of said windows, by detecting deviation between an image signal in each window as a reference signal and another image signal corresponding to said reference signal; and curvature calculating means for calculating the curvature of said guard rial from the distances calculated by the distance calculating means.

2. A guard rail detecting device as claimed in claim 1 further comprising display means for displaying the image sensed by one of said image sensors.

3. A guard rail detecting device as claimed in claim 1 further comprising alarm means for informing the driver of the vehicle that the road is sharply curved, before the vehicle reaches the sharp turn, based on a result calculated by said curvature calculating means.

* * * * *